(12) United States Patent
DiFoggio et al.

(10) Patent No.: US 7,857,066 B2
(45) Date of Patent: Dec. 28, 2010

(54) DOWNHOLE TOOLS UTILIZING ELECTROACTIVE POLYMERS FOR ACTUATING RELEASE MECHANISMS

(75) Inventors: Rocco DiFoggio, Houston, TX (US); Roderick A. Larson, Humble, TX (US); Jeffrey R. Honekamp, Tomball, TX (US)

(73) Assignee: Baker Hughes Incorporated, Houston, TX (US)

( * ) Notice: Subject to any disclaimer, the term of this patent is extended or adjusted under 35 U.S.C. 154(b) by 24 days.

(21) Appl. No.: 12/024,823

(22) Filed: Feb. 1, 2008

(65) Prior Publication Data

US 2008/0149348 A1   Jun. 26, 2008

Related U.S. Application Data

(63) Continuation-in-part of application No. 11/196,809, filed on Aug. 3, 2005, now Pat. No. 7,559,358.

(51) Int. Cl.
*E21B 23/03* (2006.01)
(52) U.S. Cl. .................... 166/381; 166/242.6; 166/65.1
(58) Field of Classification Search .................. 166/98, 166/99, 301, 381, 178, 242.6
See application file for complete search history.

(56) References Cited

U.S. PATENT DOCUMENTS

| | | | |
|---|---|---|---|
| 4,073,276 A | 2/1978 | Nicolis | |
| 4,522,745 A | 6/1985 | Kurkov | |
| 4,721,601 A | 1/1988 | Wrighton et al. | |
| 4,895,705 A | 1/1990 | Wrighton et al. | |
| 4,952,667 A | 8/1990 | Shikatani et al. | |
| 5,006,633 A | 4/1991 | Shikatani et al. | |
| 5,034,192 A | 7/1991 | Wrighton et al. | |
| 5,128,013 A | 7/1992 | Helms | |
| 5,186,813 A | 2/1993 | Helms | |
| 5,199,497 A * | 4/1993 | Ross | 166/381 |
| 5,303,775 A | 4/1994 | Michaels et al. | |
| 5,312,762 A | 5/1994 | Eli et al. | |
| 5,377,755 A | 1/1995 | Michaels et al. | |
| 5,411,573 A | 5/1995 | Kang et al. | |

(Continued)

OTHER PUBLICATIONS

Roy Kornbluh, Ron Perlrine, Venkat Shastri, Electroactive Polymer Artificial Muscle Actuators for Biologically Inspired Robots, 1st, NASA/JPL Workshop on Biomorphic Explorers, Aug. 1998, SRI International.

(Continued)

*Primary Examiner*—Kenneth Thompson
(74) *Attorney, Agent, or Firm*—Cantor Colburn LLP

(57) ABSTRACT

In one aspect, an apparatus for use in a wellbore is provided that may include: a tool configured to be conveyed into the wellbore by a conveying member; and an electro-active polymer device ("EAP device") configured to connect the tool to the conveying member when the EAP device is in a first mode or position and disconnect the tool from the conveying member when the EAP device is in a second mode or position. In another aspect, a method for releasing a tool in a wellbore is provided which includes: releasably connecting an EAP device to a conveying member and the tool; conveying the tool in the wellbore with the conveying member; and electrically activating the EAP device to release the tool from the conveying member in the wellbore.

15 Claims, 16 Drawing Sheets

U.S. PATENT DOCUMENTS

| | | | |
|---|---|---|---|
| 6,062,315 A * | 5/2000 | Reinhardt | 166/381 |
| 6,249,076 B1 * | 6/2001 | Madden et al. | 310/363 |
| 6,301,959 B1 | 10/2001 | Hrametz et al. | |
| 6,339,886 B1 | 1/2002 | Reinhardt | |
| 6,376,971 B1 | 4/2002 | Pelrine et al. | |
| 6,439,556 B1 | 8/2002 | Baudendistel et al. | |
| 6,514,237 B1 | 2/2003 | Maseda | |
| 6,543,110 B1 | 4/2003 | Pelrine et al. | |
| 6,545,384 B1 | 4/2003 | Pelrine et al. | |
| 6,583,533 B2 | 6/2003 | Kornbluh et al. | |
| 6,585,045 B2 | 7/2003 | Lee et al. | |
| 6,586,859 B2 | 7/2003 | Kornbluh et al. | |
| 6,609,568 B2 | 8/2003 | Krueger et al. | |
| 6,628,040 B2 | 9/2003 | Pelrine et al. | |
| 6,664,718 B2 | 12/2003 | Pelrine et al. | |
| 6,679,836 B2 | 1/2004 | Couvillon, Jr. | |
| 6,707,236 B2 | 3/2004 | Pelrine et al. | |
| 6,749,556 B2 | 6/2004 | Banik | |
| 6,768,246 B2 | 7/2004 | Pelrine et al. | |
| 6,770,027 B2 | 8/2004 | Banik et al. | |
| 6,781,284 B1 | 8/2004 | Pelrine et al. | |
| 6,806,621 B2 | 10/2004 | Heim et al. | |
| 6,809,462 B2 | 10/2004 | Pelrine et al. | |
| 6,812,624 B1 | 11/2004 | Pei et al. | |
| 6,876,135 B2 | 4/2005 | Pelrine et al. | |
| 6,881,063 B2 | 4/2005 | Yang | |
| 6,882,086 B2 | 4/2005 | Kornbluh et al. | |
| 6,886,509 B2 | 5/2005 | Perez Cuadro | |
| 6,891,317 B2 | 5/2005 | Pei et al. | |
| 6,911,764 B2 | 6/2005 | Pelrine et al. | |
| 6,923,916 B1 | 8/2005 | Hiraku et al. | |
| 2002/0023759 A1 | 2/2002 | Deaton | |
| 2002/0178805 A1 | 12/2002 | DiFoggio et al. | |
| 2003/0155153 A1 | 8/2003 | Masak | |
| 2004/0008853 A1 | 1/2004 | Pelrine et al. | |
| 2004/0140097 A1 | 7/2004 | Masak | |
| 2004/0202047 A1 | 10/2004 | Fripp et al. | |
| 2005/0067193 A1 | 3/2005 | Masak | |
| 2006/0158065 A1 | 7/2006 | Pelrine et al. | |

OTHER PUBLICATIONS

Kimberly Patch, Small Jolts move artificial muscle.

J.Y. Cohen, Electroactive Polymers as Artificial Muscle.

Barbar J. Akle, Mike Hickner, Donald J. Leo, James E. Mcgrath, Electroactive Polymers Based on Novel Ionomers, Proceedings of IMECE 03, 2003 ASME International Mechanical Engineering Congress, Washington D.C., Nov. 15-21, 2003, pp. 1-8.

Y. Bar Cohen, T Xue, M. Shahinpoor, J. Simpson, and J. Smith, Flexible, Low-mass Robotic Arm Actuated by Electroactive Polymers and Operated Equivalently to Human Arm and Hand, Robotics 98: The 3rd Conference and Exposition/Demonstration on Robotics for Challenging Environments Sponsored by American Society of Civil Engineer, Apr. 26-30, 1998, Albuquerque, New Mexico.

Yoseph Bar Cohen, EAP-in-Action Session, 2004 EAPAD Conference, San Diego, California, USA, Mar. 15, 2004.

P. Sommer-Larson, R.; R. Kombluh, Polymer Actuators, Origin Unknown.

Roy Kornbluh; Ron Pelrine, Qibing Pei, Seajin Oh and Jose Joseph, Ultrahigh strain response of field-actuated elastomeric polymers, Sri International, 333 Ravenswood Avenue, Menlo Park, CA 94025.

Steven Ashley; Artificial Muscles; Scientific American Inc.; Oct. 2003.

* cited by examiner

DOWNHOLE TOOLS UTILIZING ELECTROACTIVE POLYMERS FOR ACTUATING RELEASE MECHANISMS

CROSS-REFERENCE TO RELATED APPLICATIONS

The present application is a Continuation-in-Part of U.S. patent application Ser. No. 11/196,809 filed on Aug. 3, 2005, which is incorporated herein by reference in its entirety.

BACKGROUND OF THE DISCLOSURE

1. Field of the Disclosure

The disclosure relates generally to apparatuses and methods used in wellbores.

2. Description of Related Art

With reference to FIG. 1, one example of a prior art actuating device is shown therein. A downhole tool 10 is shown disposed in a well bore 5 and tethered or supported by a longitudinal member 12. Longitudinal member 12 may be a wireline, coiled tubing, or jointed drill pipe as is known in the art. As is well known in the art, such downhole tools can be in the form of an elongated apparatus known in the art as a sonde, and the actuating device is disposed within the sonde. The actuating device illustrated in the specific example of FIG. 1 is a clamping device 14. The clamping device 14 comprises a linkage arm 18 pivotally connected to a clamping arm 16. The clamping device 14 operates by angular movement of the linkage arm 18. The linkage arm 18 is powered by a motor 24 via a drive nut 22 and drive screw 20. As shown, the motor provides a rotating force onto the drive screw 20, which by virtue of its threaded connection with the drive nut 22, upwardly motivates the drive nut 22, which in turn moves the linkage arm 18. With regard to this particular application, the sonde is an acoustic device having geophones. As is known in the art, proper operation of the geophones necessitates that the sonde be tightly pressed against one side of the well bore 5.

One of the problems with such prior art devices is the large amount of weight and volume required by the clamping device 14 and its associated hardware. With regard to the clamping device 14 as shown, the motor 24 often occupies a substantial space and can have a large weight. Therefore, there exists a need for the use of downhole actuation devices that can be utilized without the requirements of large weight and/or volume.

In addition, wireline operations are carried out in oil and gas wells for conveying tools downhole in the well. A wide variety of downhole tools may be supported on a wireline including tools to perform logging, perforating, and setting and retrieving operations. The tools typically comprise a combination of different tubular members threaded together to form a working unit which is manipulated and controlled from the surface via the wireline. Although tools may be conveyed downhole on a tubing string which can withstand substantially higher extraction forces than a wireline, oftentimes a wireline is preferred because it saves substantial rig time in conveying tools downhole and positioning them within the well. A cable head, which connects the tools to the wireline, is typically provided with a release mechanism to permit the wireline to be disconnected from the tools, such as when the tools become stuck downhole, or after setting a tool intended to be left downhole.

The commonly accepted safe operational pull of the wireline is a pull which does not exceed one-half the breaking strength of the wireline. When a tension is placed on the wireline which is over 50% of its break point, then problems begin to occur with the electrical conductors in the wireline. Also, there is the danger of breaking the wireline.

A typical wireline release utilizes a mechanical weak point in the connection between the wireline and the cable head. Typically this is a metal member which is designed to break upon a predetermined pull on the wireline. The correct conventional mechanical weak point must be calculated and installed prior to running the cable head and tools into the borehole on the wireline.

There are certain limitations in using the typical mechanical weak point release devices. One is the strength of the wireline itself and the other is the strength of the mechanical weak point. For example, when the tool is stuck, the operator generally fishes for the tool with the wireline still attached to the tool in the wellbore. The operator lowers a grapple on a separate line, such as a slick line, which grabs the top of the cable head or the tool body. The operator attempts to release the wireline from the tool. Removing the wireline makes it easier to pull the tools and pipe out of the wellbore. In order to effect the release, the operator places a large tension on the wireline to activate the mechanical release. If the cable head and tools are in a deviated wellbore, the effects of friction on the wireline may prevent the mechanical link at the cable head from receiving sufficient tension to break the link. In some cases, the wireline may break at some uphole location before the mechanical link breaks. The presence of the broken wireline substantially impairs the fishing operation for the stuck tools.

Various other apparatuses and methods have been provided for releasing the wireline from the cable head and tools. One such method includes the use of a spring set at a selected tension. Once the force on the spring exceeds the selected tension, the wireline is released. This release still requires that the amount of load required to release the wireline be predetermined prior to lowering the cable head into the well. If the spring tension exceeds that selected tension, the cable head can release prematurely.

Another typical release system relies primarily on shear pins or shear screws. The shear pins or screws can have a low failure point because they are exposed to various cyclical forces, which tend to affect their ultimate shear rating. The shear pins or screws are exposed to the fluids in the wellbore which over time can affect the inherent strength of the shear screws or pins, thereby making them susceptible to failure at stresses below their rated failure point. Unexpected release can significantly delay operations, causing additional operating expense. An unexpected release can also result in the loss of downhole tools and in extreme cases can cause severe damage to the wellbore.

When the cable head and tools get stuck in the wellbore and the wireline breaks upon pulling on the wireline with too much tension, fishing operations to retrieve the tools become difficult. Therefore, there is a need for an improved apparatus and method for releasing a tool from a conveying member, such as wireline.

BRIEF SUMMARY OF THE DISCLOSURE

In one aspect, an apparatus for use in a wellbore is provided that may include: a tool configured to be conveyed into the wellbore by a conveying member; and an electro-active polymer device ("EAP device") configured to connect the tool to the conveying member when the EAP device is in a first mode or position and disconnect the tool from the conveying member when the EAP device is in a second mode or position.

In another aspect, a method of releasing a tool in a wellbore is provided, which method may include: releasably connecting an EAP device to a conveying member and the tool; conveying the tool in the wellbore with the conveying member; and electrically activating the EAP device to release the tool from the conveying member in the wellbore.

BRIEF DESCRIPTION OF THE DRAWINGS

For detailed understanding of the present invention, references should be made to the following detailed description of the preferred embodiment, taken in conjunction with the accompanying drawings, in which like elements have been given like numerals, wherein.

DETAILED DESCRIPTION OF THE DISCLOSURE

Figure 1:
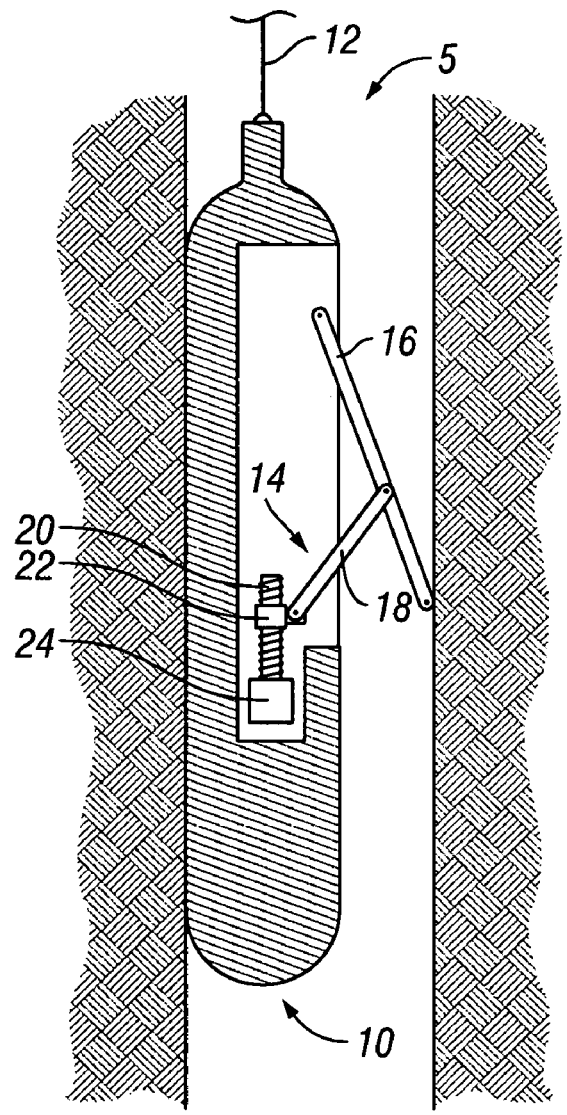
FIG. 1 illustrates a prior art downhole tool with a clamping device.

Certain polymers have been found to undergo change in shape upon the application of electrical voltage. Such a polymer is called as an "Electroactive Polymer" or "EAP." EAPs can induce strains that are as high as two orders of magnitude greater than the movements of rigid and fragile electroactive ceramics. EAP materials generally have higher response speeds, lower densities and improved resilience compared to shape memory alloys. Electroactive polymers also are flexible materials that are capable of converting energy in the form of electric charge and voltage to mechanical force and movement. EAPs also can operate in room conditions for long periods of time, have rapid response time, can hold strains under direct current activation, and induce relatively large actuation forces.

EAPs can have several configurations, but are generally divided in two principal classes: Dielectric EAPs and Ionic EAPs. Some specific EAPs are: Poly Vinylidene Fluoride or PVDF and its copolymers. These are the most exploited ferroelectric polymers. They consist of a partially crystalline component in an inactive amorphus phase. Large applied AC fields (~200 MV/m) can be applied to induce electrostrictive (non-linear) strains of nearly 2%. Poly(vinylidene fluoride-trifluoro-ethylene), or P(VDF-TrFE), is a PVDF polymer which has been subject to electron radiation. P(VDF-TrFE) has displayed electrostrictive strain as high as 5% at lower frequency drive fields (150 V/mm). Ferroelectric EAP polymer actuators can be operated in air, vacuum or water and throughout a wide temperature range. Electrostatic fields can be employed to those polymers exhibiting low elastic stiffness and high dielectric constants to induce large actuation strain. These polymers are known as electrostatically stricted polymers (ESSP) actuators.

Dielectric EAP actuators require large electric fields (~100 V/mm) and can produce large strain levels (10-200%). An acrylic elastomer tape is capable of planar strains of more than 300% for biaxially symmetric constraints and linear strains up to 215% for uniaxial constraints. Electrostrictive Graft Elastomers are polymers consisting of two components, a flexible macromolecule backbone and a grafted polymer that can be produced in a crystalline form. The material exhibits high electric field induced strain (~4%) combined with mechanical power and excellent processability.

A typical example of a dielectric EAP is a combination of an electrostrictive-grafted elastomer with a piezoelectric poly (vinylidene fluoride-trifluoro-ethylene) copolymer. This combination has the ability to produce a varied amount of ferroelectric-electrostrictive molecular composite systems. These may be operated as a piezoelectric sensor or even an electrostrictive actuator.

Electrostrictive Paper is composed of a multitude of discrete particles, that are mainly of a fibrous nature forming a network structure. An example of electrostrictive paper is silver laminated paper in which two silver laminated pieces of paper with silver electrodes are placed on the outside surfaces. Upon applying an electric voltage to the electrodes, a bending displacement occurs. These types of actuators are lightweight, simple to fabricate and are likely to be used in applications such as active sound absorbers, flexible speakers and "smart" shape control devices.

Electro-Viscoelastic Elastomers are composites of silicone elastomer and a polar phase. Upon curing, an electric field is applied that orientates the polar phase within the elastomeric matrix. An applied electric field (<6 V/mm) induces changes in the shear modulus. Liquid Crystal Elastomer (LCE) Materials possess EAP characteristics by inducing Joule heating. LCEs are composite materials consisting of monodomain nematic liquid crystal elastomers and conductive polymers which are distributed within their network structure. The actuation mechanism is a phase transition between nematic and isotropic phases. The actuation takes place in less than a second.

Ionic Polymer Gel is a polymer gel having the potential of matching the force and energy density of biological muscles. The polyacrylonitrile materials are activated by chemical reaction(s), a change from an acid to an alkaline environment inducing an actuation through the gel becoming dense or swollen. The actuation is somewhat slow due to the diffusion of ions through the multilayered gel.

Ionomeric Polymer-Metal Composites (IPMC) can bend in response to an electrical activation as a result of the mobility of cations in the polymer network. IPMC require relatively low voltages to stimulate a bending response (1-10 V) with low frequencies below 1 Hz. Conductive Polymers (CP) actuate via the reversible counter-ion insertion and expulsion that occurs during redox cycling. Significant volume changes occur through oxidation and reduction reactions at corresponding electrodes through exchanges of ions with an electrolyte.

Electrodes are commonly fabricated from polypyrrole or polyaniline (or PAN) doped with HCl. CP actuators require voltages in the range of 1-5 V. Varying the voltage can be useful in controlling actuation speeds. Relatively high mechanical energy densities of over 20 J/cm$^3$ are attained with these materials, however, they posses low efficiencies at levels of 1%. Other material combinations for CP are polypyrrole, polyethylenedioxythiophene, poly(p-phenylene vinylene)s, polyaniline and polythiophenes. Some applications for these CPs include miniature boxes that have the ability to open and close, micro-robots, surgical tools, and surgical robots that assemble other micro-devices.

Carbon Nanotubes (CNT) are formal EAPs with diamond-like mechanical properties. In CNTs, the actuation mechanism occurs through an electrolyte medium. An injection of charges affects the ionic charge balance between the nanotube and the electrolyte and causes a change in bond length. The more charges that are injected into the CNT the larger the dimension change. Because of the mechanical strength and modulus of single CNTs and the achievable actuator displacements, these EAPs display a high work per cycle and generate much higher mechanical stresses than other forms of EAPs.

Suitable EAPs for use in the apparatus and methods of this disclosure may include substantially insulating polymer or rubber (or a combination thereof) that changes shape in response to an electrostatic force or whose change in shape results in a change in an electric field. Exemplary materials include silicone elastomers, acrylic elastomers such as VHB 4910 acrylic elastomer, polyurethanes, thermoplastic elastomers, copolymers comprising PVDF, pressure-sensitive adhesives, fluoroelastomers, polymers comprising silicone and acrylic moieties, and the like. Polymers which comprise silicone and acrylic moieties may include those copolymers comprising silicone and acrylic moieties, polymer blends comprising a silicone elastomer and an acrylic elastomer, for example.

In one embodiment, a downhole actuator is provided that is housed within a downhole tool 10 for use in activating certain components of downhole tools. The downhole actuator may include an electroactive polymer which responsively expands when exposed to an applied electrical current. The actuator further may comprise a linkage mechanism useful in transmitting the motive force of the electroactive polymer onto the component that is being activated by the system. Examples of components actuated by the downhole EAP actuator may include a clamping arm, a slip, anchors, a valve, a pump, etc. When operated at higher frequencies, the EAP may also be used as an actuator in a wavelength modulation spectrometer based on an oscillating interference filter (see, for example, U.S. Appl. No. 2005/0018192) or as the actuator in a derivative spectrometer based on a reciprocating linear variable filter (see, for example, U.S. Pat. No. 6,798,518). EAPs may be used in low-frequency (0-100 Hz) downhole acoustic sources. EAPs may also be used in downhole active vibration cancellation mounts for printed circuit boards, sensors, and other components.

Figure 2A:
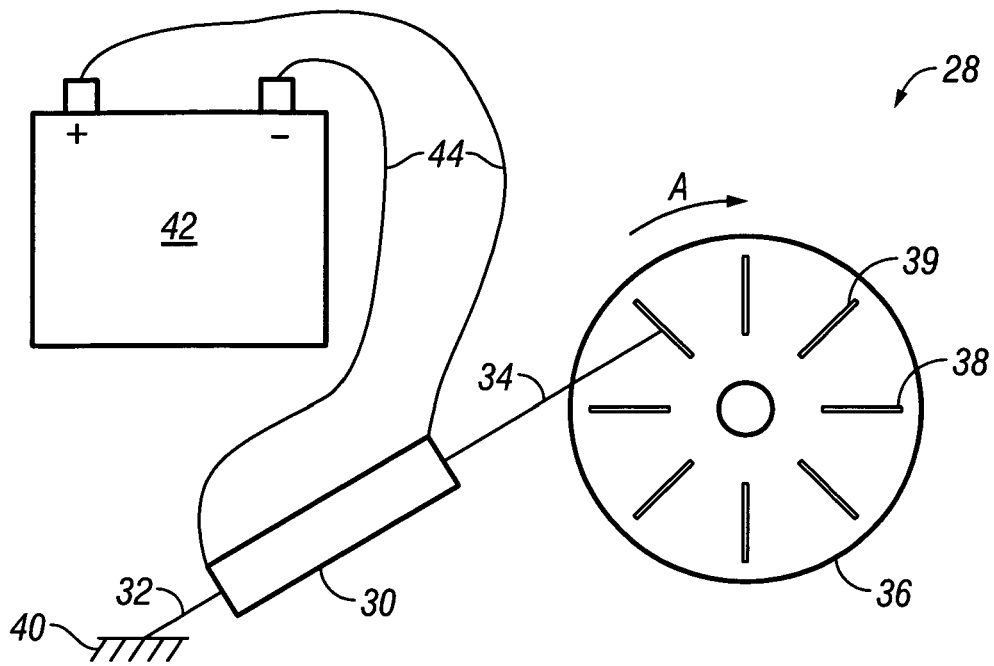
FIGS. 2A and 2B demonstrate in side view one embodiment of a downhole actuator.
Figure 2B:
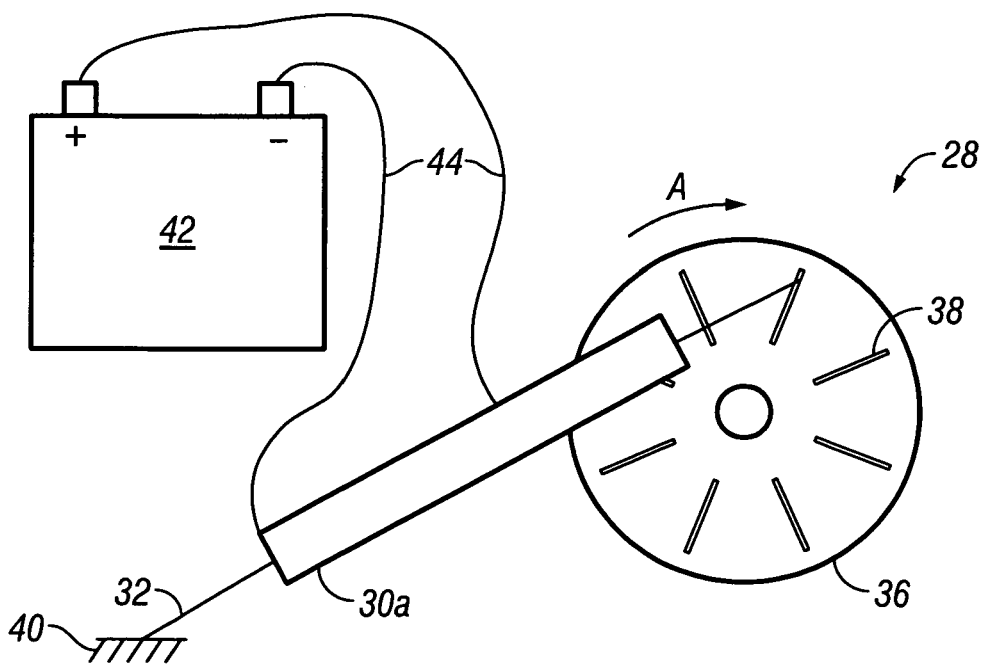

FIGS. 2A and 2B show a downhole actuator according to one aspect of the present disclosure. The downhole actuator embodiment shown in FIG. 2A is shown to comprise a first connecting rod 32, and a segment of an EAP 30 connected between the first connecting rod 32 and a second connecting rod 34. The combination of the EAP 30, the first connecting rod 32, and the second connecting rod 34 creates an advancement device that upon stimulation of the EAP 30 imparts a motivating force or motion onto another device or body. The unattached end of the second connecting rod 34 is shown operatively coupled to a notch 38 formed on a ratchet disk 36.

The ratchet disk 36 of FIGS. 2A and 2B is shown as a generally planar member. While shown in a generally radial form, the ratchet disk 36 may have any other suitable configuration, such as an angular configuration, a triangular configuration, or possibly a configuration having a series of radially extending sprockets operatively cooperating with an outermost member of the advancement device, which as shown in FIGS. 2A and 2B may be a second connecting rod 34. Leads 44 provide for electrical current to flow between the electroactive polymer 30 and an electrical supply 42. The electrical supply 42 may be in the form of a battery, may be received via the wire line 12, or may be generated downhole with the use of a hydraulic motor or any other now known or later developed electrical current generating device.

As shown in FIG. 2A, the EAP 30 is shown in a relaxed state without the application of the electrical current. FIG. 2B however illustrates a stimulated and therefore expanded variant of the EAP 30 and indicates (in comparison with FIG. 2A) how the corresponding expansion of the EAP has extended the second connecting rod 34. As shown, expansion of the second expansion rod 34 in turn rotates the ratcheting disk 38 in a clockwise direction. The rotational direction of the ratcheting disk 36 is shown by the arrow A. Successively removing the application of electrical current from the electroactive polymer 30 causes the electroactive polymer 30 to retract into the state as shown in FIG. 2A.

Upon counterclockwise rotation of the ratcheting disk by the advancement device, selectively coupling the second connecting rod 34 to an adjacent notch 39 disposed counterclockwise to the first notch 38 sets up the advancement device to further rotate the ratcheting disk 36 via a subsequent expansion of the electroactive polymer member 30. Thus, successive applications of electrical current to the EAP 30 will result in a continuous type rotation of the ratchet disk 36 as shown in the direction of the arrow A. Also as shown, the end of the first connecting rod 32 not connected to the electroactive polymer 30 is connected to a base 40 which can be any secure location within the downhole tool in which the downhole actuator 28 is housed. Therefore the reciprocated action of the electroactive polymer 30 can be turned into a rotary motion for use in activation of the certain components of the downhole tool 10.

Figure 3:
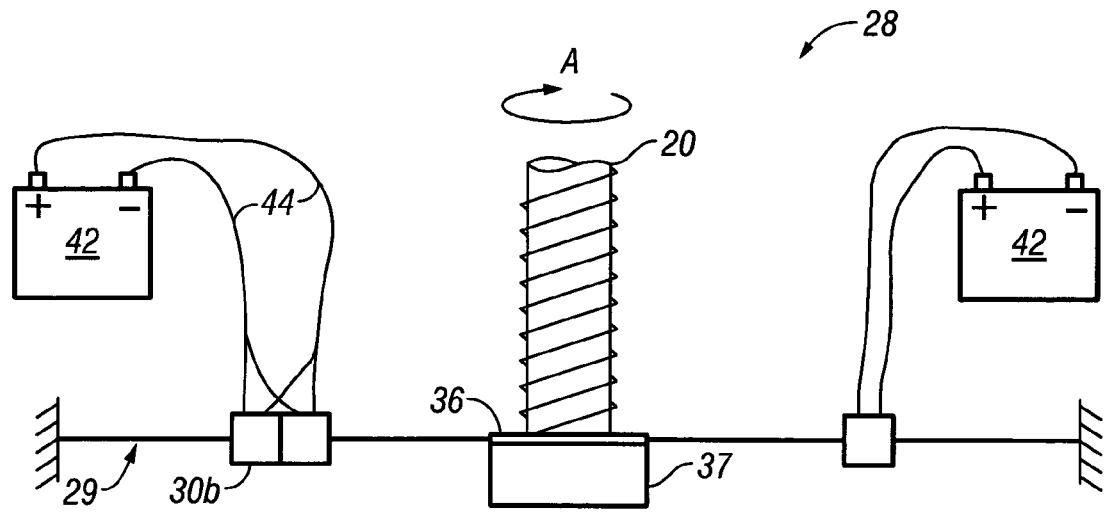
FIG. 3 depicts a side view of an alternative embodiment of a downhole actuator.

Another embodiment of a downhole actuator 28 is shown in FIG. 3, in which the ratchet disk 36 is affixed to a threaded drive screw 20 such that the reciprocation or rotation of the ratchet disk 36 causes rotation of the drive screw 20. As previously discussed, a drive nut (not shown) may be attached to the drive screw 20 for actuation of the components of the downhole tool 10. The drive screw 20 may be attached a foundation 37 for securing it within the housing of the downhole tool 10. In FIG. 3, a second downhole actuator 29 is shown that is coupled to the drive screw 20 for rotating the drive screw 20 in a direction opposite to that rotated by the first downhole actuator 28. Rotating the drive screw 20 in an opposite direction allows for retraction of any such mechanism initially activated by the downhole actuator 28.

In yet another of a downhole actuator, the EAP 30 of the downhole actuator 29 may be comprised of at least two distinct segments of an EAP material. Accordingly, the present disclosure is not limited to downhole actuators having a single segment of EAP material, but may comprise two or more such segments.

Figure 4:
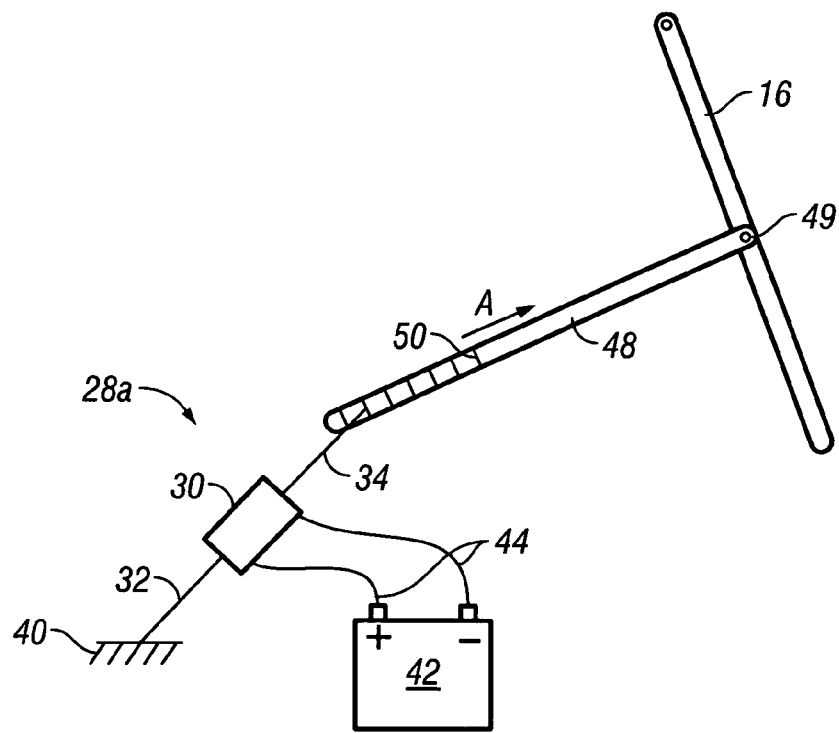
FIG. 4 portrays a side view of an embodiment of a downhole actuator.

FIG. 4 shows yet another embodiment of a downhole actuator 28a. The actuator 28a is shown to include a first connecting rod 32 secured to a base 40 on one side and the EAP 30 on the other side. On the opposite side of the EAP 30, a second connecting rod 34 is attached. The free end of the second connecting rod 34 may be selectively coupled with a drive rod 48 having a series of indentations or drive rod notches 50 disposed on the outer surface of the drive rod 48. On the end of the drive rod 48 opposite to the second connecting rod 34 is a pivoting connecting 49 where the drive rod is pivotally connected to clamping arm 16. Successive application of electrical energy to the electroactive polymer 30 extends the drive rod 48 outward against the clamping arm 16, thereby driving the clamping arm 16 into a desired disposition. The downhole too also may utilize notches or sprocket like connectors for advancing or transmitting a moving force throughout the linkage system.

Figure 5:
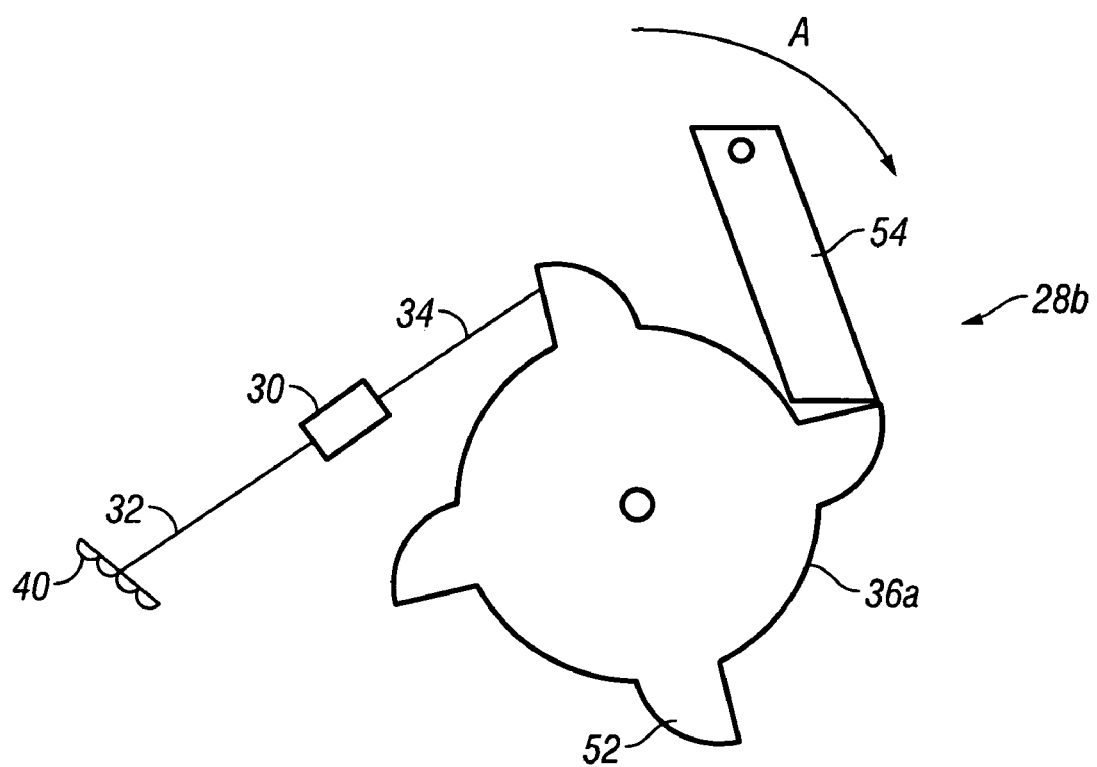
FIG. 5 illustrates a side view of a downhole actuator.

FIG. 5 illustrates a downhole actuating device similar to that shown in FIGS. 2A and 2B. However, instead of having notches disposed on one side of a planar disk, teeth 52 may be disposed on the outer circumference of a ratchet disk 36a. The ratcheting device may include any type of actuating element having notches or teeth formed thereon, wherein a reciprocating motion can impart either a linear or rotational motion upon a notched or teeth member. The tangential force applied to the flat side of these teeth 52 will rotate the disk in the direction of the arrow A. Rotation of the ratchet disk 36 opposite to the direction of the arrow A can be prevented by the presence of the pivoting pawl 54. The actuator of FIG. 5 is interchangeable with the combination shown in FIG. 3.

In each of the configurations shown herein, as well as other equivalent movement devices, the members that receive the motivating force from the advancement device would act as a motivating member by imparting a motivating force onto the actuator disposed in the tool. The linkage systems disclosed herein, i.e. the combination of elements that serve to transfer the motivating force from expansion of the EAP onto the downhole component being actuated, may be expanded beyond the embodiments provided herein. A gearing system or multiple linkage systems also may be employed.

Figure 6A:
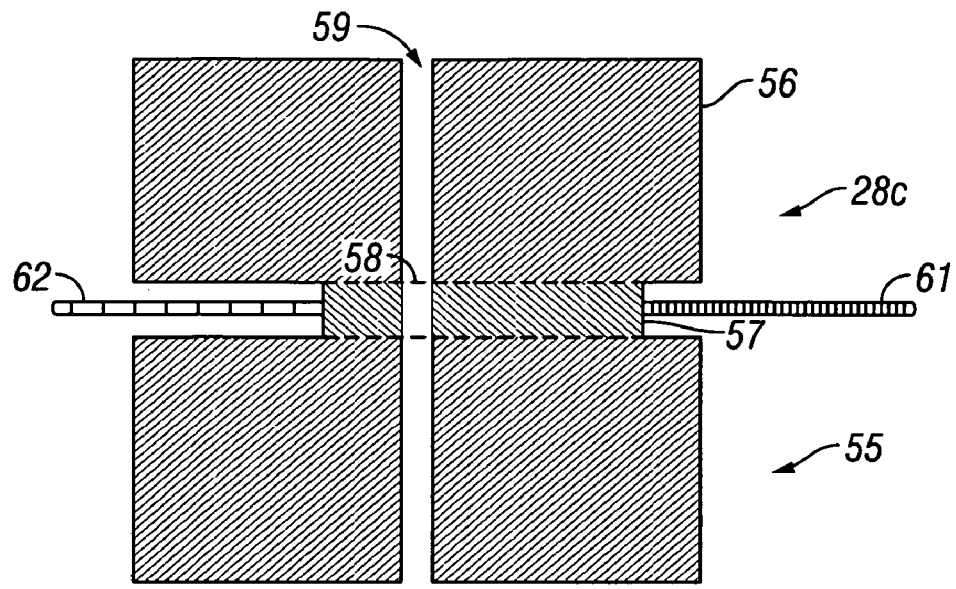
FIG. 6 illustrates a partial cutaway view of an embodiment of an actuator.
Figure 6B:
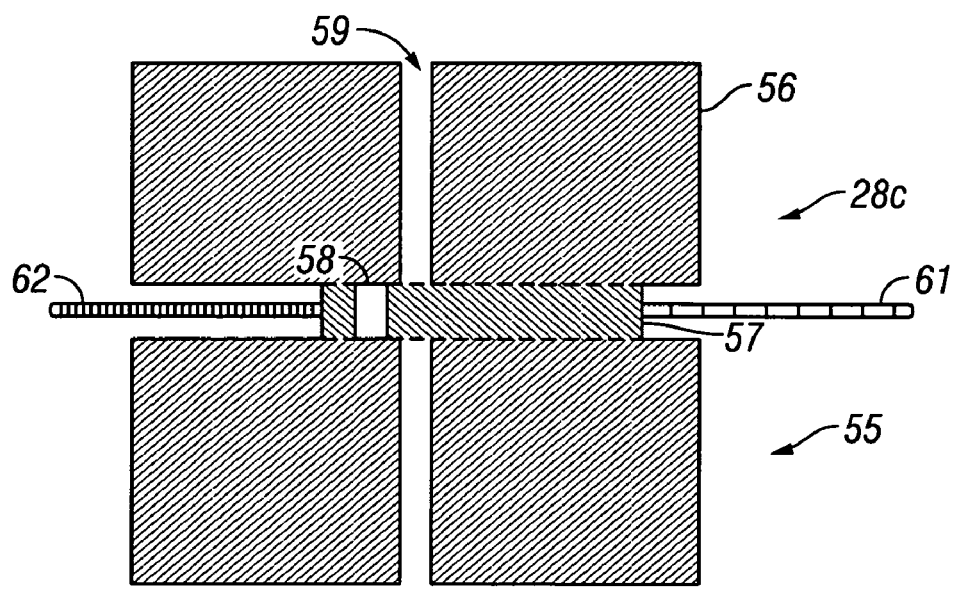

FIGS. 6A and 6B show embodiment wherein the downhole actuator 28c is used in conjunction with a valve 55. The valve is comprised of a valve body 56 with a passage 59 formed through the body for allowing the passage of fluid therethrough. A slide 57 is provided within the valve body 56 that is disposed perpendicular to the passage 59. The slide 57 is provided with a slide aperture 58 that is alignable with the passage 59 for allowing fluid flow through the valve 55. Selective placement of the slide 57 within the valve body 56 regulates the flow of the fluid through the valve 55.

The selective placement of the slide 57 may be accomplished by the addition of a first member 61 and a second member 62. These members may be formed from an EAP material, or some other polymeric material that is responsive to the application of an electrical current or voltage. FIG. 6A shows the valve 55 with valve slide 57 in an open position, such that the slide aperture 58 is aligned with the passage 59 to allow for fluid flow. Selectively actuating the valve 55 into its open position may be accomplished by contracting the first member 61 while simultaneously allowing the second member 62 to be in a relaxed state. As previously discussed, activation of electrically responsive materials may be accomplished by the application of electricity via an electrical source (not shown).

FIG. 6B shows the valve 55 in a closed position. In the closed position, the aperture is urged into the valve body and out of communication with the passage 59. Movement of the slide 57 from the open position to the closed position may be accomplished by activating the second member 62 while allowing the first member 61 to be in a relaxed state (i.e. removal of an applied electrical current or voltage). The valve configuration used in conjunction with the first and second members (61,62) is not limited to the slide valve as disclosed herein. Any other types of suitable valves may be used for the purpose of this disclosure, including but not limited to, gate valves, rotary valves, ball valves, and the like.

Figure 7:
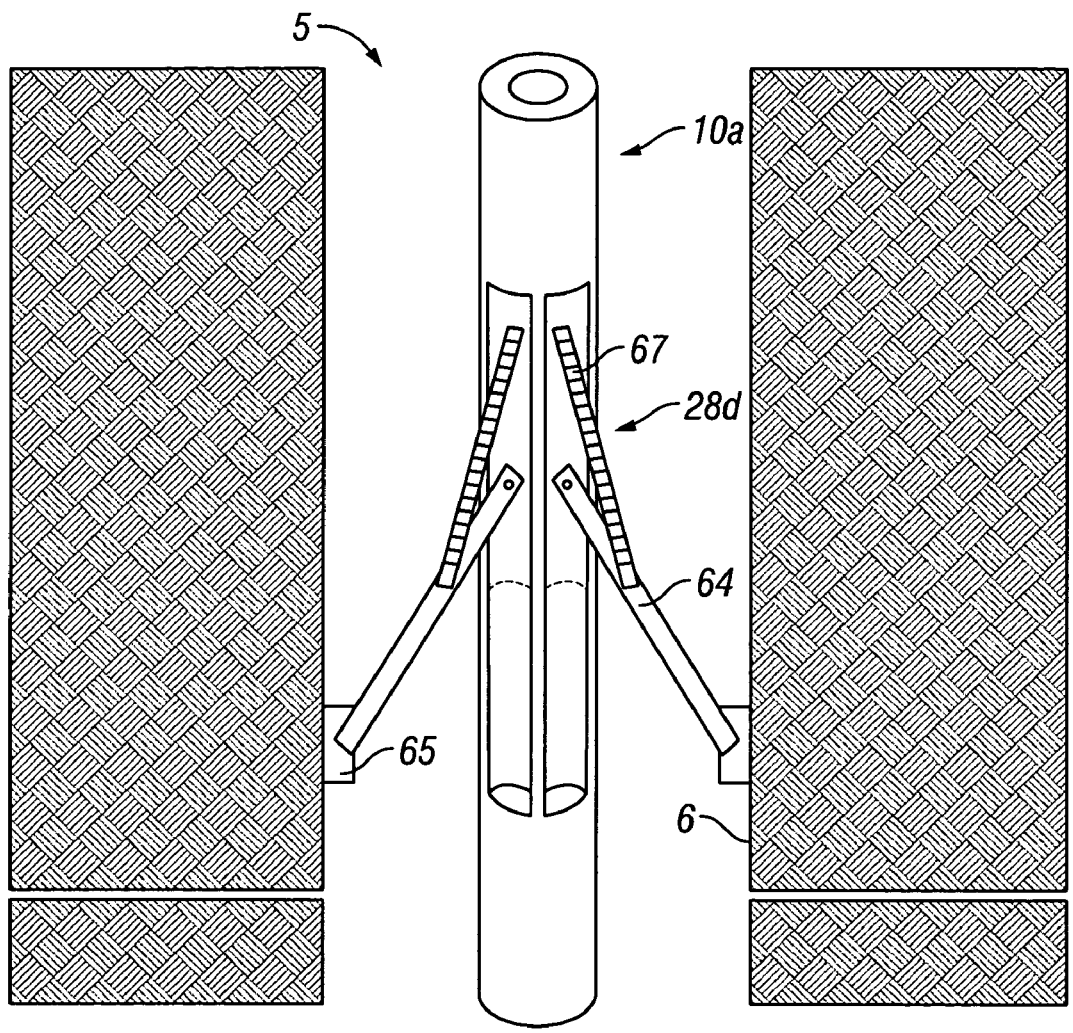
FIG. 7 depicts a side-view of an embodiment of a downhole actuator.

In FIG. 7, the downhole actuator 28d is shown as part of a downhole tool 10a having a tool arm 64 connected to the downhole tool 10a. The tool 10a is in a two arm configuration that can be pivotally extended from the downhole tool 10a to contact the surrounding inner diameter 6 of the wellbore 5. Pads 65 are provided on the free end of the tool arm 64 to contact the wellbore inner diameter 6. A deployment member 67 is shown connected along a length of the tool arm 64 on one end and to the tool body 10a on the other end. As with the other actuators, the deployment member 67 may be comprised of an EAP or similar material, i.e. one that is responsible to the application of electrical voltage or current. The deployment members 67 of FIG. 7 are shown in a contracted state thus responding to the application of external electricity. Subsequent deactivation of the applied electrical current or voltage can allow the deployment member 67 to relax and the tool arm to retract back to the tool housing. This embodiment is useful for tools that have one or more pads on one or more extendable arms, which make their measurements with the pads in contact with the wall of the wellbore. Examples of such tools include Baker Hughes' Earth Imager and STAR Imager (resistivity based formation imagers), Hexagonal Diplog (for determining bedding plane dip) and pad-based acoustic tools. It could also be used to extend backup arms or fluid recovery probes in Baker Hughes' Reservoir Characterization Instrument ("RCI").

Figure 8:
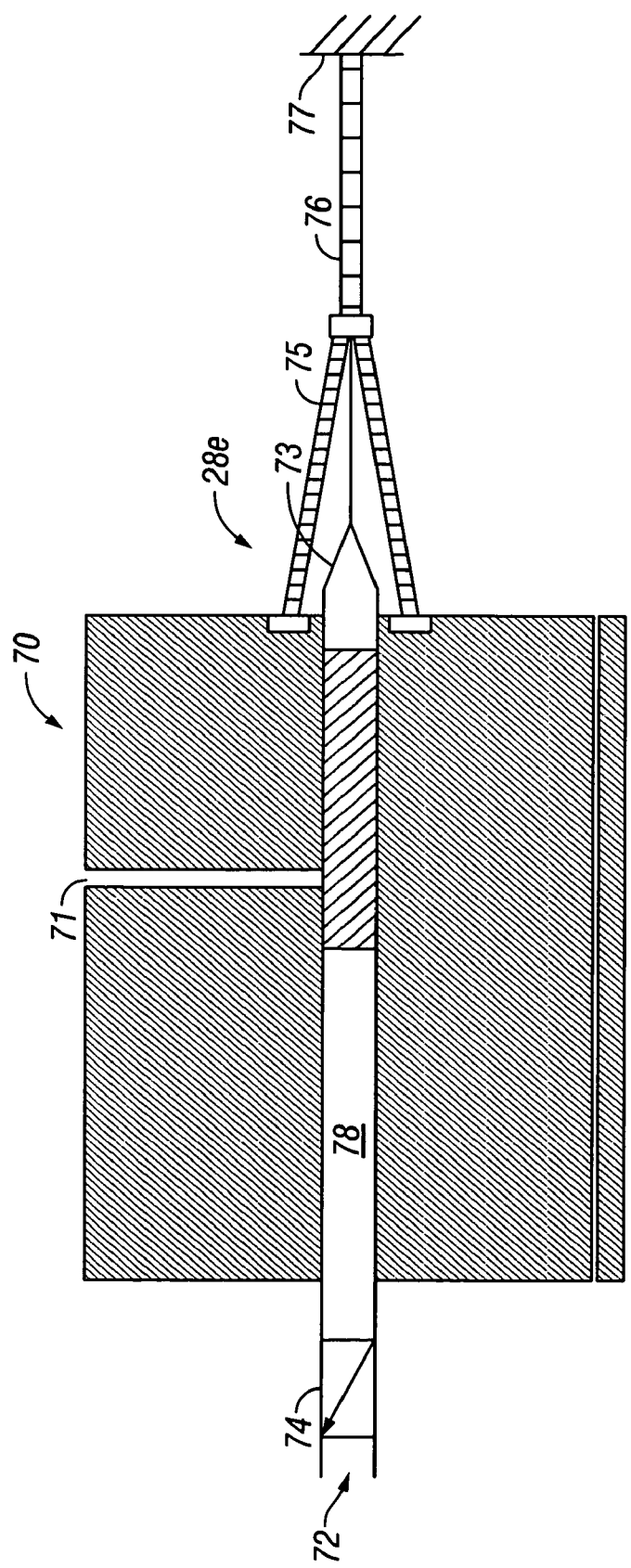
FIG. 8 is a partial cutaway view of an embodiment of an actuator.

In the embodiment of the downhole actuator 28e as shown in FIG. 8, the actuator 28e is used in a pumping application. A pump 70 is shown having a piston 73, where the piston is reciprocatingly disposed in an axial passage 78 formed along the body of the pump 70. Reciprocation of the piston 73 is accomplished by the implementation of both a compression element 75 and a reciprocation element 76. As shown, the compression element 75 is attached on one end to the free end of the piston 73 and on the other end to the body of the pump. The reciprocation element 76 is also attached to the free end of the piston on one of its ends and to a static base 77 on its other end. As with the other actuators disclosed herein, the material for both the compression and reciprocating element (75, 76) may be comprised of an EAP or polymeric electrically responsive material. Accordingly, activation of the compression element 75 contracts these elements, thereby pushing the piston through the passage 78. During the compression stroke any fluid lying within the passage will be urged outward through the pump discharge 72. The presence of a check valve 74 proximate the open end of the pump discharge 72 serves to prevent fluid flow back into the pump 70.

Stimulating the reciprocation element 76 in conjunction with relaxing the compression element 75 enables contraction of the reciprocation element 76, thereby pulling the piston out of the passage 78 toward the support base 77. A pump inlet 71 is formed on one side of the pump body, through the body of the pump 70, and onto the pump passage 78. Selective and sequential activation and deactivation of the compression and reciprocation elements (75, 76) results in a pumping action for motivating pressurized fluid through the pump 70. Continued rearward urging of the piston will result in the piston moving behind the pump inlet 71, thereby allowing fluid flow from the exterior of the pump 70 into the pump passage 78.

Figure 10:
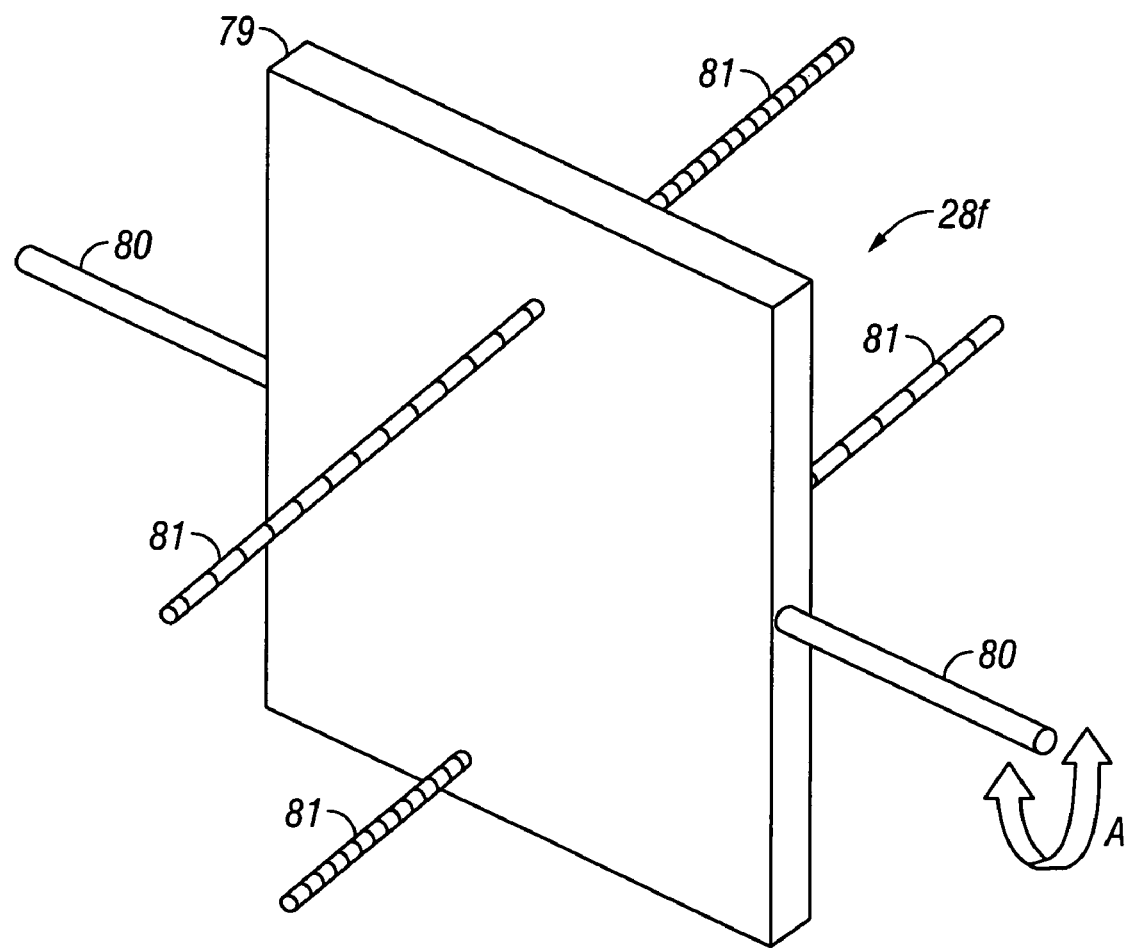
FIG. 10 is a perspective view of an embodiment of an actuator used with an interference filter.

With reference to FIG. 10, an embodiment of a downhole actuator 28f is shown in combination with an optical filter 79. The filter 79 may be used in conjunction with a wavelength modulation spectrometer or a derivative spectrometer. When used in conjunction with the wavelength modulation spectrometer, the filter 79 acts as an oscillating interference filter. A wavelength modulation spectrometer as discussed in detail in co-pending patent application having Ser. No. 10/827,948 filed on Apr. 20, 2004, which is fully incorporated herein by reference.

When the actuator 28f is used as a derivative spectrometer, the filter 79 acts as a reciprocating linear variable filter. An example of a derivative spectrometer is discussed in U.S. Pat. No. 6,798,518, issued to R. DiFoggio on Sep. 28, 2004. U.S. Pat. No. 6,798,518 is assigned to the assignee of this application. U.S. Pat. No. 6,798,518 is fully incorporated herein by reference. In operation, the filter 79 of FIG. 10 is mounted on a pivoting spindle 80 and actuation of the filter 79 about the spindle 80 is accomplished by the connection of at least two actuating members 81 to the filter 79. Compression of an actuating member 81 on one side of the filter while allowing relaxation of the actuating member 81 opposite the compressed actuating member 81 enables a reciprocating or oscillating movement of the filter 79 about the spindle 80. The reciprocating movement of the filter 79 is shown by arrow A. As with the other actuators discussed herein, the actuating members 80 may be comprised of an electrically responsive material such as EAP or another polymeric material that can be stimulated by application of electrical energy.

Figure 9C:
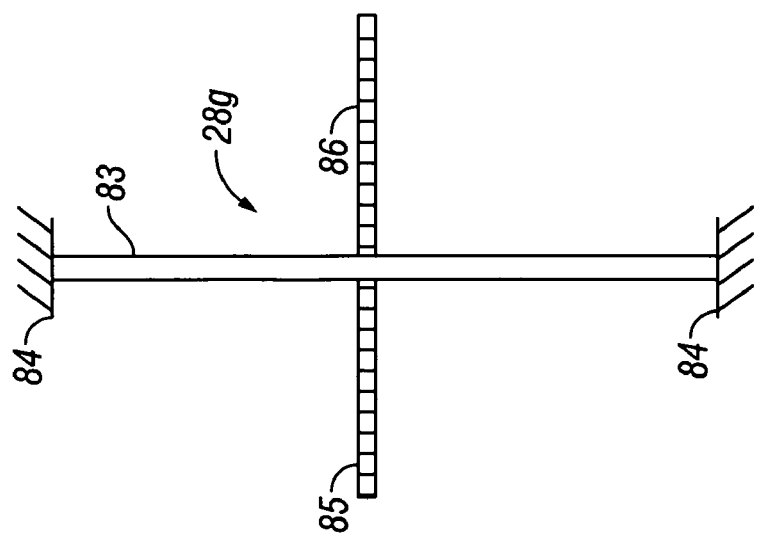
FIGS. 9A-9C portray a sideview of an embodiment of an actuator capable of producing an acoustic signal.
Figure 9B:
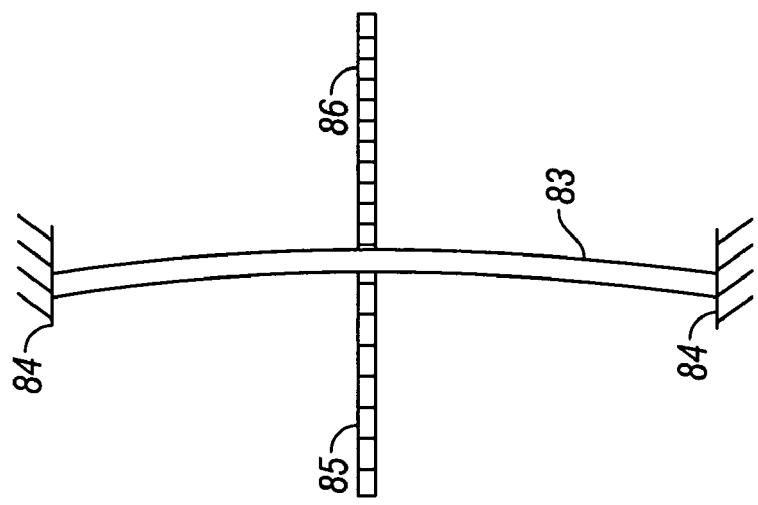
Figure 9A:
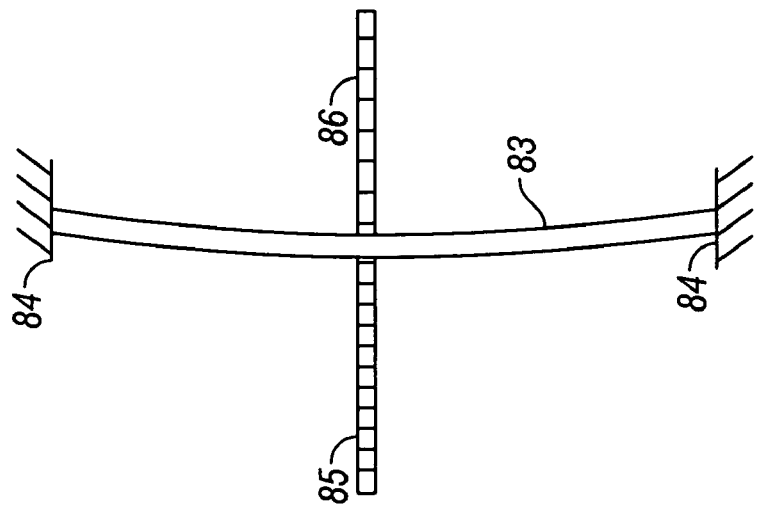

FIGS. 9A through 9C illustrate how a downhole actuator 28g may be used as an acoustic source. A tympanic member 83 is shown connected on opposite ends within supports 84 and having a first member 85 and a second member 86 connected along the length of the tympanic member 83 between the supports 84. FIG. 9A shows both the first and second members (85, 86) in a relaxed state, without the application of any applied electricity. FIG. 9B shows the second member 86 in a compressed state due to the application of electricity thereby pulling the tympanic member toward the side having the second member 86. FIG. 9C shows how the first member 85 reacts to external electrical stimulation by being compressed, which when done in conjunction with relaxation of the second member 86, allows the tympanic member 83 to bulge in a direction of the first member 85.

Successive repeated reciprocation of the tympanic member caused by stimulation and relaxation of the first and second member (85, 86) can thereby oscillate the tympanic member 83. The oscillation of the member 83 in turn can impart a compressional shock wave into the media (such as air or liquid) surrounding the member thereby producing an acoustic signal that is transmitted from the actuator 28g. Such an acoustic signal can be used to produce sound waves within the wellbore used for analyzing formations, casings, tubing, and any other element situated in a subterranean local. Accordingly, the tympanic member 83 can be used in the form of a speaker to create such acoustic signals. The tympanic member 83 can also be formed to respond to any acoustic signals it receives and be deformed in the manner as shown in FIG. 9B or FIG. 9C. The corresponding contraction or expansion of the first or second member (85, 86) can be measured by their corresponding electrical impulses, thereby producing an electrical signal that can be measured and recorded that might be representative of the acoustic signals received by the tympanic member 83. While FIGS. 9A through 9C illustrate an actuation device 28g having a first member and second member (85, 86), this device may be operated with a single member attached thereto or more than two members. In another aspect, the electroactive polymers may also be immersed directly into a wellbore fluid to act either as a downhole acoustic source when electrically excited or to act as an acoustic receiver that generates electrical signals when struck by acoustic waves.

Figure 11:
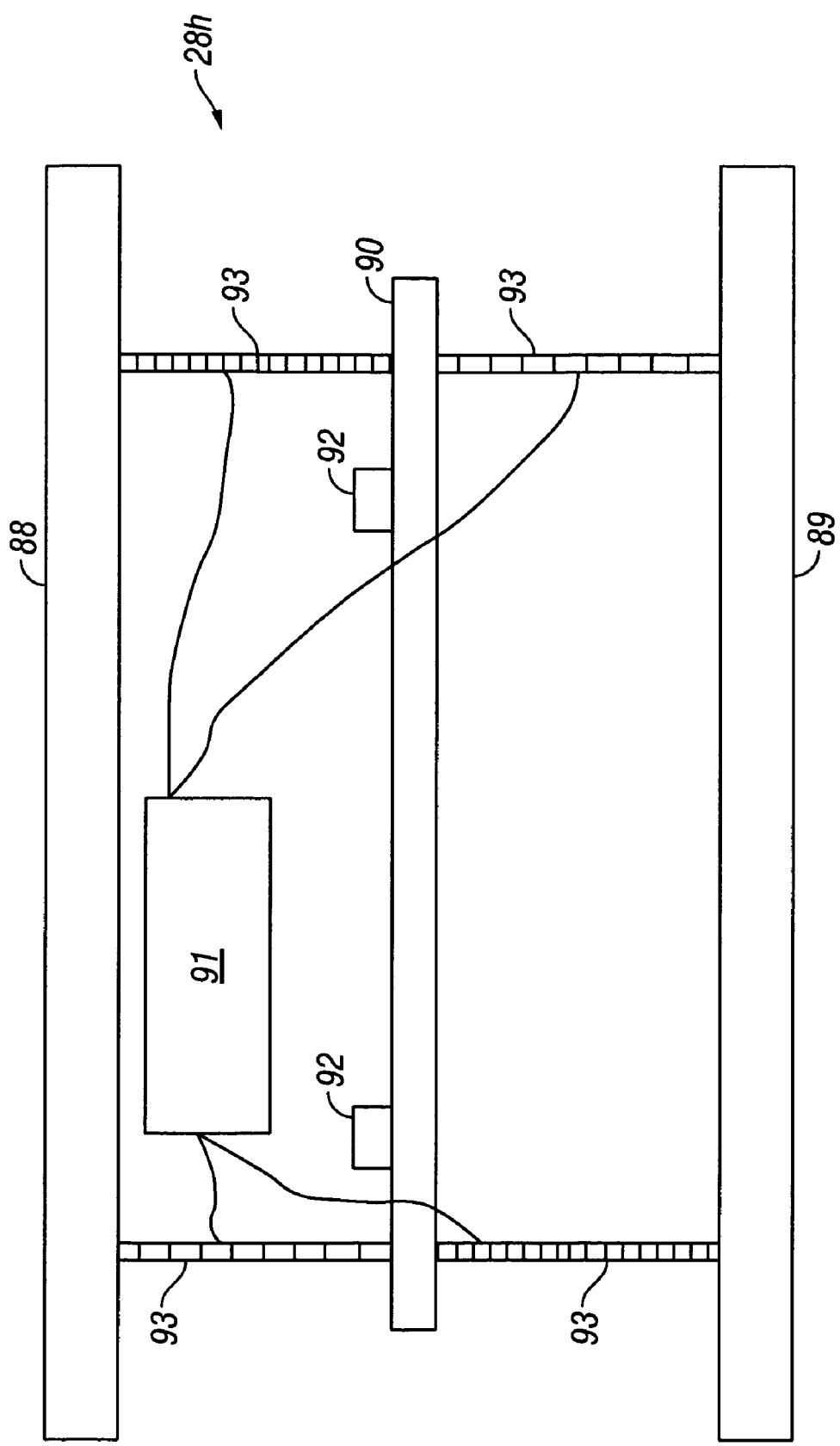
FIG. 11 is a side view of an embodiment of a vibration compensation device.

The FIG. 11 shows a downhole actuator 28h that may be used for active vibration cancellation of vibration experienced by a sensitive component, such as a printed circuit board or another device that is sensitive to shock. The device is shown disposed within an upper pressure housing 88 and a lower pressure housing 89. Provided on the device 90 are accelerometers 92 used for detecting the shock, vibration or general acceleration imparted to device 90 during downhole use. A feedback circuit 91 is shown in electrical communication with compensating members 93. The compensating members provide support between the vibration sensitive device and the upper and lower housings (88, 89). Based upon the measurements from the accelerometers 92, the feedback circuit 91 can provide a stimulating electrical signal to anyone of the compensating members 93, thereby moving the vibration sensitive device 90 to compensate for shock, vibration or acceleration experienced during use. While the feedback circuit 91 is shown in direct electrical communication with the compensating members 93, the communication between these two elements may be accomplished by hard wiring or by any other form of telemetry. The feedback circuit attempts to reduce or minimize the acceleration that is experienced by the accelerometers that are attached to the device 90 by independently moving the two ends of the device 90 in the opposite directions to which each accelerometer is reporting acceleration. The feedback circuit may apply a different voltage to each of the electroactive polymers 93 where the voltage polarity and magnitude are selected to counteract direction and magnitude of acceleration computed from accelerometer measurements.

Figure 12:
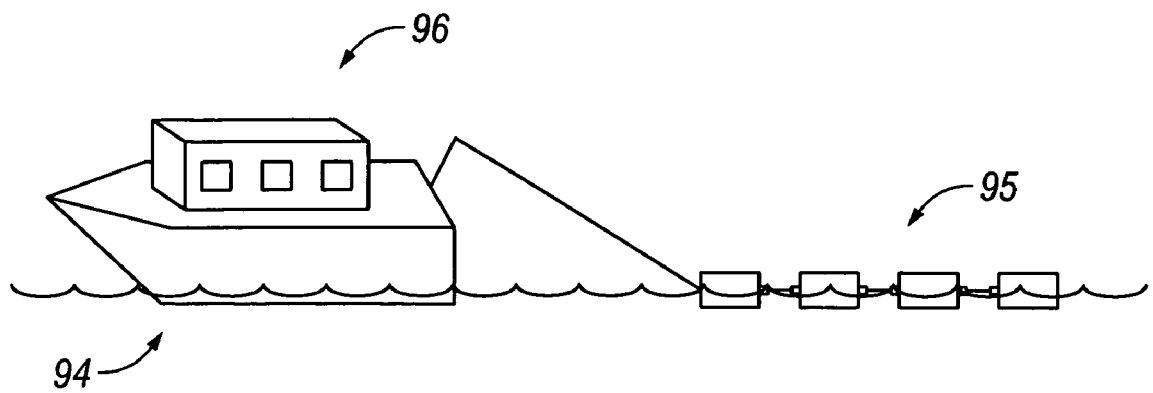
FIG. 12 illustrates a perspective view of an air gun array.

FIG. 12 illustrates an acoustic wellbore imaging system. The system comprises an air gun array 95 towed behind a vessel 96. Air guns are generally towed through a body of water 94, such as a lake, a marshland or open sea. Compressed gas, such as air stored within the individual air guns of the array 95, is discharged into the body of water 94 to produce air bubbles. The air bubbles from the various guns coalesce to produce an acoustic signal that travels through the body of water 94 and into the subterranean formation 8. The resulting seismic signal is received and recorded by receivers placed in a wellbore 5 formed within the formation 8.

Figure 13:
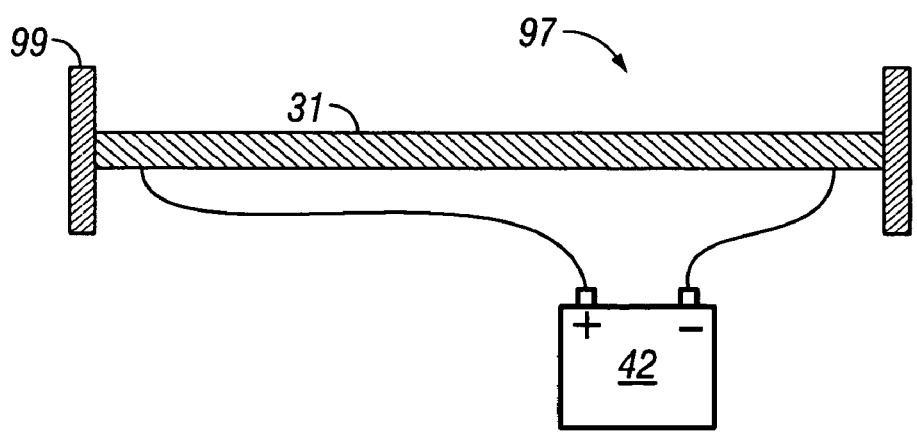
FIG. 13 is a side view of a marine acoustic source.

FIG. 13 shows a cross-section of an embodiment of an acoustic source 97. Acoustic source 97 is comprised of an electrically responsive material 31, bounded on its outer periphery to a support 99. The electrically responsive material 31 may be affixed to the support 99 at its outer periphery or to any other suitable device. The support 99 may have any configuration, including rectangular, circular or any other desired shape. Also shown in FIG. 13, is an electrical source 42 with its positive and negative leads in electrical communication with portions of the electrically responsive material 31. In operation, the acoustic source 97 is placed in a body of water and an electrical source is provided to the electrically-responsive material 31 from the electrical supply 42. Upon application of the electrical supply, the electrically responsive material 31 expands outward in a semi-circular like fashion into the surrounding body of water 94. Each movement of the electrically responsive material 31 into the body of water 94 is capable of producing a seismic signal into the body of water. The seismic source produce signals in the body of water 94 by the expansion and contraction of the electrically responsive material 31, which travel through the water and are ultimately recorded by seismic recording devices disposed in subterranean locations.

Percussion acoustic sources (air gun, explosion, etc.) generate acoustic impulses that contain many frequencies, especially higher frequencies in the kilohertz range. However, only a small fraction of their energy is expended to produce low frequencies (those less than 100 Hertz and particularly those less than 50 Hertz), that can travel long distances (such as 1000 feet to several miles) through subterranean formations. The higher frequencies attenuate over a short distance and therefore a majority of the percussion source energy is wasted. However, an electroactive polymer can be excited substantially at a selected frequency (such as 50 Hz, 100 Hz, 1000 Hz, etc.), depending upon the application.

Figure 14:
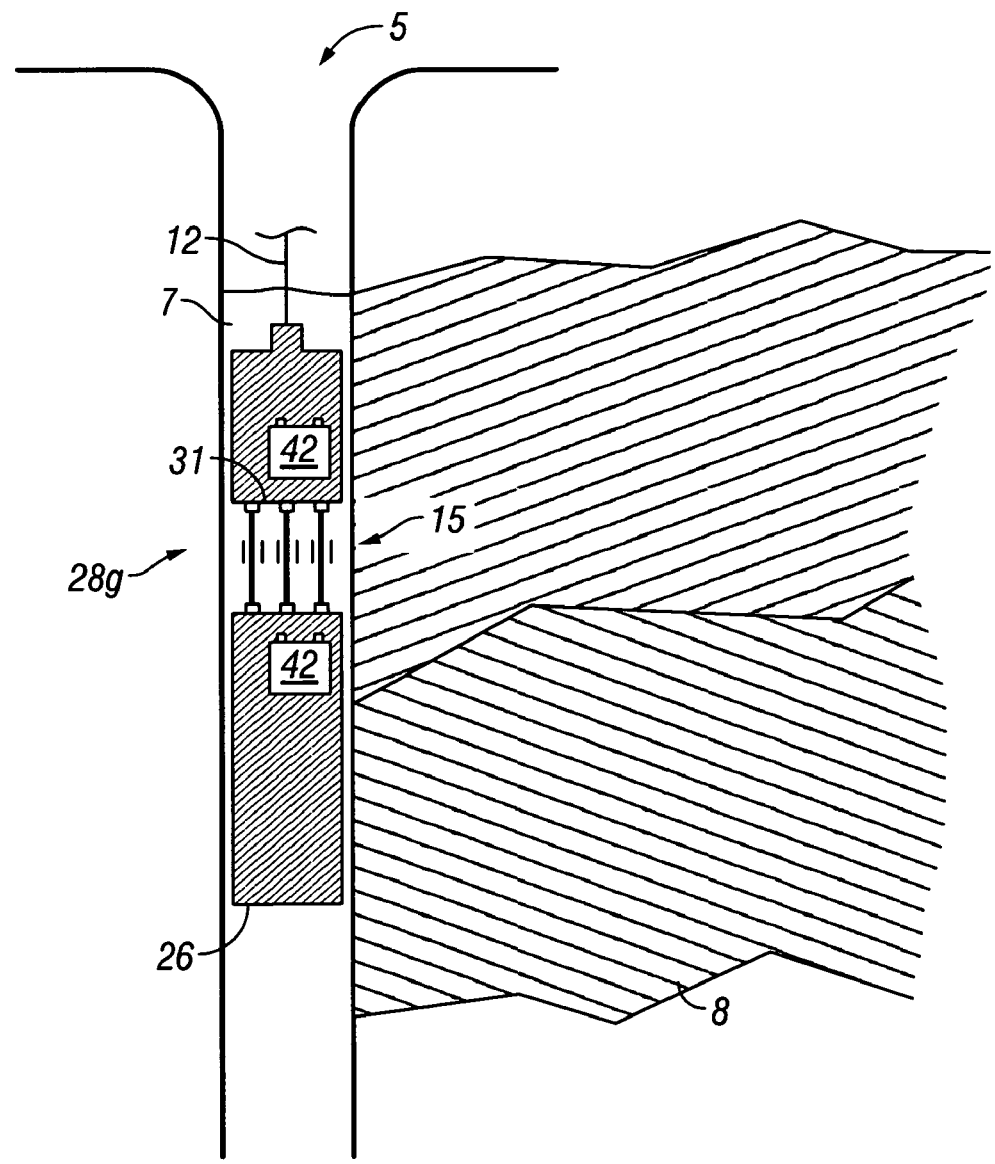
FIG. 14 portrays a partial cutaway side view of an acoustic device.

FIG. 14 shows another embodiment of an acoustic source having a downhole actuator 28g that comprises an electrically responsive element 31 disposed between supports within a tool 26 deployed in a wellbore 5. An electrical source 42 in the tool provides electrical energy to the electrically responsive element 31 to expand the electrically responsive element 31. In one aspect, wellbore fluid 7 may enter the tool 26 and come in contact with the outer surface of the electrically responsive element 31. Expansion of the electrically responsive element 31 creates an acoustic impulse or signal within the wellbore fluid 7. The generated acoustic signal travels from the fluid 7 and into the formation 8 adjacent the well bore 5. The seismic signal travels into the formation and reflection of the signal is reflected back to within the wellbore. Recording devices are disposed within the well bore 5 and/or at the surface for recording and analysis of these signals in order to help determine well bore structure and parameters.

Figure 15:
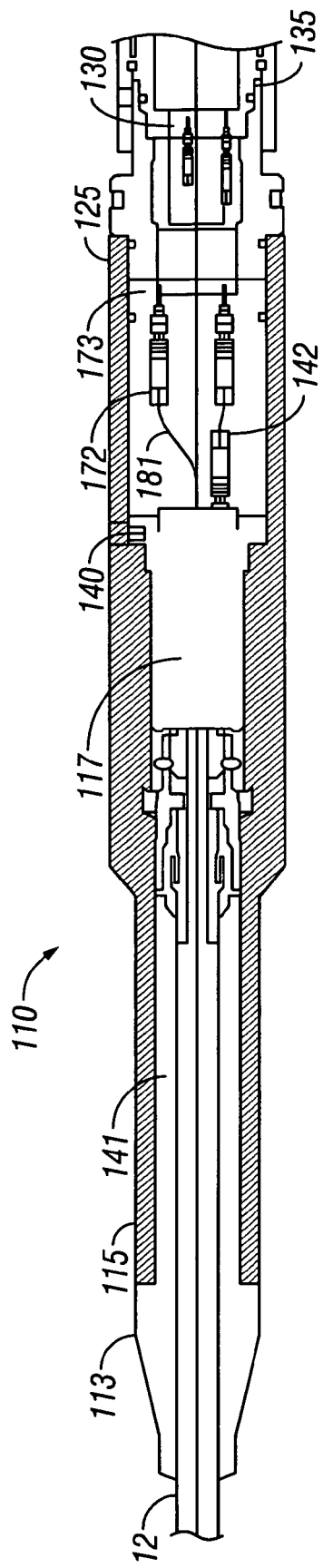
FIG. 15 is a view of a releasable cable head assembly.
Figure 16A:
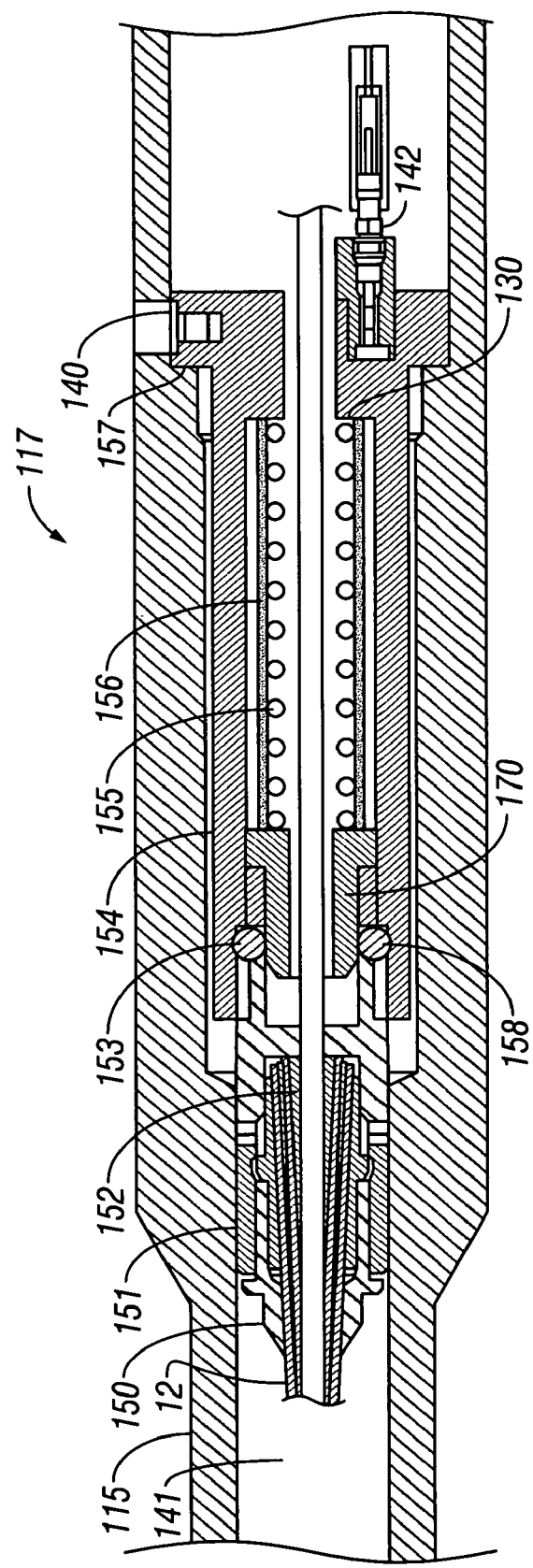
FIG. 16A is a view of a releasable cable head assembly in the locked position.
Figure 16B:
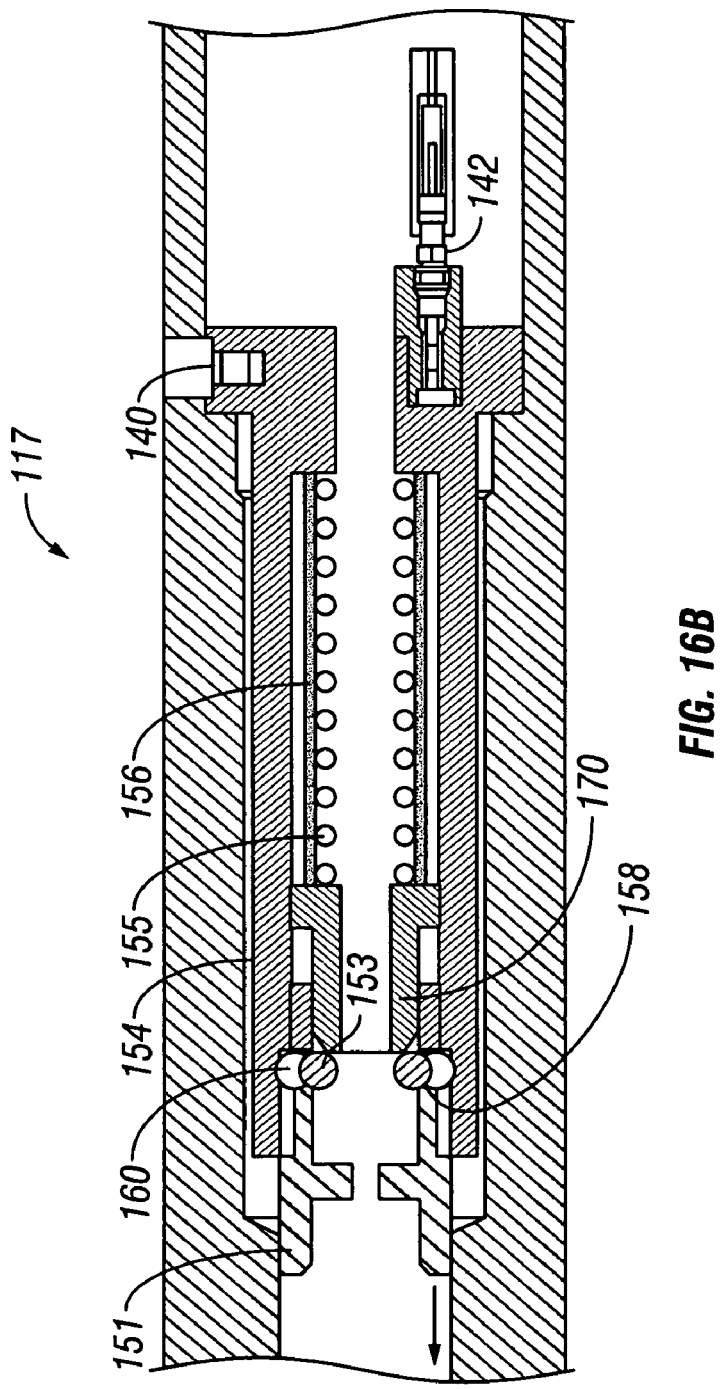
FIG. 16B is a view of the releasable cable head assembly of FIG. 16A in the unlocked, or released position.

In another embodiment, FIG. 15, FIGS. 16A and 16B, an electro-active polymer ("EPA") device 110 is utilized to release a downhole tool 115, 201 from a conveying member 12, such as a wireline, coiled tubing, jointed tubing, etc. The EAP device 110 is releasably connected to the conveying member 12 and the tool 115, 201, 110 prior to deploying the tool 115, 201 into the wellbore. The conveying member 12 may be a wireline cable, coiled tubing, jointed pipe, etc. In one aspect, the conveying member 12 may be inserted in the conveyance tool 110 through an elastomeric cap 113. The cap 113 extends inside the housing 116 of the tool 115. The cap 113 is sized to be compressed around the cable 12 as the cap 113 is inserted in the housing 116. In this configuration, the cap 113 acts as a seal against the entry of wellbore fluid into the housing 116. In one aspect, the housing 116 may be filled with a non-conductive grease 141 through a fill port 140. Alternatively, a non-conductive oil may be used to fill the housing 116. The end of the wireline cable 12 may be terminated and captured with a full-armor cone 152 and a basket 150 assembly. Alternatively, any suitable cable termination may be used. The basket 150 may be threadably connected to a release sleeve 151. The release sleeve 151 may be connected to a latching assembly 117, which is releasable from a surface or downhole remote electrical control. The latching assembly 117 (see FIGS. 16A and 16B), in one aspect, may comprise a restraining sleeve 154 fixedly attached in the housing 115. The restraining sleeve 154 transfers tension loading on the wireline to the housing through a shoulder 157. The restraining sleeve 154 may include an annular groove 60 (see FIG. 16B) on an inner surface. The release sleeve 151 may include one or more radial through holes 158 arranged around a circumference such that the holes 158 are juxtaposed with an annular groove 160 when the release sleeve 151 is inserted in the restraining sleeve 154. The holes 158 and the annular groove 160 are sized to accept locking elements 153. In the locked position (see FIG. 16A), the locking elements 153 are captured between the restraining sleeve 154 and the release sleeve 151 by a locking sleeve 170. In one aspect, the locking elements 153 may be axially aligned rollers with appropriately shaped holes in the release sleeve. The number, size, and material of the locking elements 153 are determined such that the shear strength of the locking elements substantially exceeds the tensile strength of the conveying member 12.

The locking sleeve 170 is forced into the locked position by a spring 155 that is captured between locking sleeve 170 and a shoulder 180 on the restraining sleeve 154. An electro active polymer (EAP) element 154, similar to that described previously, is attached between the locking sleeve 170 and shoulder 180. When the EPA element 156 is energized (see FIG. 16B), the EAP 156 element contracts, moving the locking sleeve 170 toward the shoulder 180. The movement of the EAP element 156 compresses the spring 155, which allows the locking elements 153 to move inwardly. When the locking elements 153 clear the slot 160, the cable 12 is released from engagement with the latching the assembly 117, and allows the cable to be retrieved to the surface. Electrical conductors 181 are connected to connectors 172 at a pressure sealed bulkhead 173 (see FIG. 15) for connection and operation of at least one downhole tool 115. Power to actuate EAP 156 is provided by a controller 190 through the connector 142. The connectors 172 and 142 are pressure sealed against intrusion of downhole fluids by sealing elements, such as o-rings and elastomeric boots. The controller 190 may be located in an atmospheric pressure sealed chamber in the tool 135 or in a similar chamber in the EAP device 110. Alternatively, the controller 190 and associated electronics may be located in a separate module (not shown) connected between the EAP device 110 and the downhole tool 135.

Figure 17:
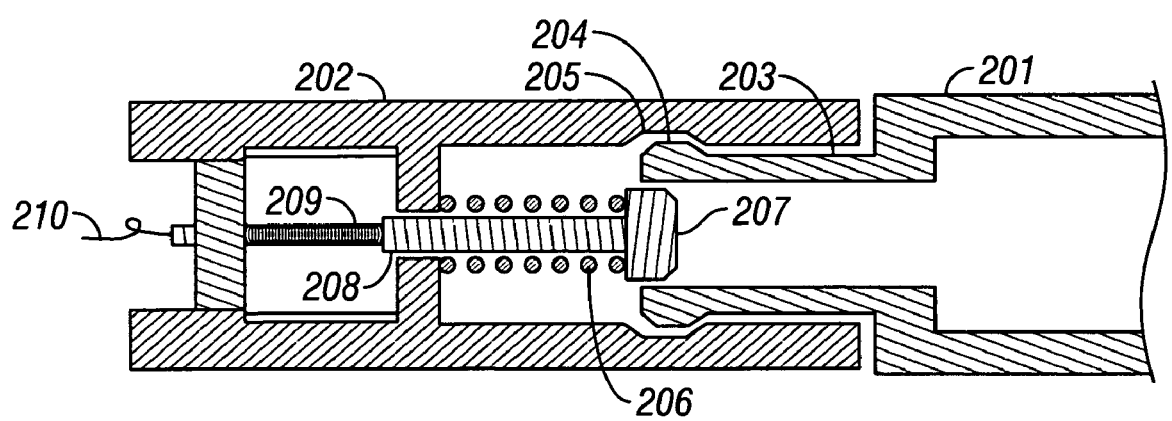
FIG. 17 is a view of a releasable conveyance tool.

In another embodiment, see FIG. 17, a downhole tool 201 may be attached to an EAP device 202. The downhole tool 201 may be a any tool that performs an operation downhole. The tool 201 may be a perforating gun, a logging tool (including a resistivity tool, an acoustic tool, a nuclear magnetic resonance tool, a nuclear logging tool), a formation testing tool, a packer, a downhole valve, or any other conveyable well tool. The conveying member 202 and downhole tool 201 may be inserted in a wellbore by wireline, coiled tubing, jointed tubing, etc. The downhole tool 201 may be connected to EAP device 202 through a collet arrangement. Collet fingers 203 include upsets 204 that spring into a substantially mating groove 205 in EAP device. Collet fingers 203, in a conveyance mode, are locked in engagement in groove a 205 by locking element 207 attached to a shaft 208. The dimensions of the locking element 207 are such that when it is engaged within collet fingers 203, the collet fingers are prevented from springing inward to disengage with groove 205. Locking element 207 is held in the engaged position by spring 206. Attached to shaft 208 is an electro-active polymer (EAP) element 209. When the EAP element 209 is electrically activated through wire 210, the EAP element 209 contracts, moving the locking element 207 out of the locking position.

Thus, in one aspect, the disclosure provides an apparatus for use in a wellbore that includes: a tool configured to be conveyed into the wellbore by a conveying member; and an electro-active polymer device ("EAP device") configured to connect the tool to the conveying member when the EAP device is in a first mode and disconnect the tool from the conveying member when the EAP device is in a second mode. The EAP device, in aspect, may include an electro-active polymer element (EAP element"); a first member, a second member, and a locking element, wherein the locking element locks the first member to the second member when the EAP element is deactivated and unlocks the first member from the second member when the EPA element is electrically activated. In another aspect, the EAP device may further include a spring member that keeps the first and second members locked when the EAP element is deactivated and allows the first and second members to unlock then the EPA element is electrically activated. In one aspect, the spring member compresses to allows one of the first member and second member to move away from each other when the EAP element is electrically activated.

In another aspect, the apparatus may include a controller that controls the activation of the EAP device. The controller is electrically coupled to the EAP device and may be located at the surface; in the EAP device or in the tool. The conveying member may be any suitable member, including but not limited to a wireline, a coiled tubing, and a jointed tubing. Any suitable tool may be utilized, including but not limited to: a formation logging tool, a formation testing tool, a perforating gun, and a packer. Any suitable locking element or mechanism may be utilized, including but not limited to, one or more balls or collet fingers. In one aspect, the EAP device may include: a movable member, a release member, a locking element, an EAP element, and a spring member, wherein the spring member moves into an extended position to move the movable member toward the release member when the EAP element is deactivated to cause the locking element to lock the movable member to the release member and compresses to move the movable member away from the release member to cause the locking member to unlock the movable member from the release member when the EAP element is electrically activated.

In another aspect, the disclosure provides a method of releasing a tool in a wellbore, which may include: releasably connecting an EAP device to a conveying member and the tool; conveying the tool in the wellbore with the conveying member; and electrically activating the EAP device to release the tool from the conveying member in the wellbore. Electrically activating may include electrically activating an EAP element associated with the EAP device. The method may further comprise: engaging the first member and the second member with the locking element when an EPA element associated with the EPA device is in a deactivated position; and electrically activating the EPA element to disengage the first member from the second member when the tool is in the wellbore. In one aspect, electrically activating the EPA element causes the first member to move away from the second member to disengage the conveying member from the tool. The locking element may be any suitable locking device or mechanism including but not limited to one or more balls and one or more collet fingers. The conveying member may be any suitable device or mechanism, including but not limited to: a wireline, a coiled tubing, and a jointed tubing. The tool may be any tool suitable for use in wellbore, including but not limited to: a formation logging tool; a formation testing tool; a perforating gun, and a packer.

In another aspect, the method may include: providing an EAP device that includes a movable member, a release member, a locking element, an EAP element, and a spring member, wherein the spring member moves into an extended position to move the movable member toward the release member when the EAP element is deactivated to cause the locking element to lock the movable member to the release member and compresses to move the movable member away from the release member to cause the locking member to unlock the movable member from the release member when the EAP element is electrically activated; and engaging one of the movable member and release member to the tool and the other of the movable member and release member to the conveying member; conveying the tool in the wellbore with the conveying member; and electrically activating the EAP element to disengage the movable member from the release member to release the tool from the conveying member.

The foregoing description is directed to particular embodiments for the purpose of illustration and explanation of the concepts of the disclosure. It will be apparent, however, to one skilled in the art that many modifications and changes to the embodiment set forth above are possible without departing from the scope of the and concepts of the disclosure. It is intended that the following claims be interpreted to embrace all such modifications and changes.

What is claimed is:

1. An apparatus for use in a wellbore, comprising:
    a tool configured to be conveyed into the wellbore by a conveying member; and
    an electro-active polymer device ("EAP device") configured to connect the tool to the conveying member when the EAP device is in a first mode and disconnect the tool from the conveying member when the EAP device is in a second mode, wherein the EAP device includes an electro-active polymer element ("EAP element"), a first member, a second member, and a locking element, and wherein the locking element is configured to lock the first member to the second member when the EAP element is deactivated and to unlock the first member from the second member when the EAP element is electrically activated.

2. The apparatus of claim 1, wherein the EAP device further comprises a spring member configured to keep the first and second members locked when the EAP element is deactivated and to allow the first and second members to unlock when the EAP element is electrically activated.

3. The apparatus of claim 2, wherein the spring member is configured to compress to allow one of the first member and second member to move away from the other when the EAP element is electrically activated.

4. The apparatus of claim 1 further comprising a controller configured to control the activation of the EAP device.

5. The apparatus of claim 4, wherein the controller is configured to be electrically coupled to the EAP device and is located at one of: (i) the surface; (ii) in the EAP device; and (iii) in the tool.

6. The apparatus of claim 1, wherein the conveying member is selected from a group consisting of: (i) a wireline; (ii) a coiled tubing; and (iii) a jointed tubing.

7. The apparatus of claim 1, wherein the tool is selected from a group consisting of: (i) a formation logging tool; (ii) a formation testing tool; (iii) a perforating gun; and (iv) a packer.

8. The apparatus of claim 1, wherein the locking element is configured to be moveable and is selected from a group that consists of: (i) one or more balls; and (ii) one or more collet fingers.

9. The apparatus of claim 1, wherein the EAP device further comprises:
    a movable member, a release member, and a spring member, wherein the spring member is configured to: (i) move into an extended position to move the movable member toward the release member when the EAP element is deactivated to cause the locking element to lock the movable member to the release member, and (ii) compress to move the movable member away from the release member to cause the locking member to unlock the movable member from the release member when the EAP element is electrically activated.

10. A method of releasing a tool in a wellbore, comprising:
releasably connecting an EAP device to a conveying member and the tool,
conveying the tool in the wellbore with the conveying member; and
electrically activating the EAP device to release the tool from the conveying member in the wellbore by:
activating an EAP element associated with the EAP device;
engaging a first member and a second member with a locking element when the EAP element is in a deactivated position; and
electrically activating the EAP element to disengage the first member from the second member when the tool is in the wellbore.

11. The method of claim 10, wherein electrically activating the EPA element causes the first member to move away from the second member to disengage the conveying member from the tool.

12. The method of claim 10, wherein the locking element is selected from a group consisting of: one or more balls; and one or more collet fingers.

13. The method of claim 10, wherein the conveying member is selected from a group consisting of: (i) a wireline; (ii) a coiled tubing; and (iii) a jointed tubing.

14. The method of claim 10, wherein the tool is selected from a group consisting of: (i) a formation logging tool; (ii) a formation testing tool; and (iii) a perforating gun.

15. A method of releasing a tool in a wellbore, comprising:
providing an EAP device that includes a movable member, a release member, a locking element, an EAP element, and a spring member, wherein the spring member (i) moves into an extended position to move the movable member toward the release member when the EAP element is deactivated to cause the locking element to lock the movable member to the release member, and (ii) compresses to move the movable member away from the release member to cause the locking member to unlock the movable member from the release member when the EAP element is electrically activated;
engaging one of the movable member and release member to the tool and the other of the movable member and release member to the conveying member;
conveying the tool in the wellbore with the conveying member; and
electrically activating the EAP element to disengage the movable member from the release member to release the tool from the conveying member.

* * * * *